(12) United States Patent
Kim

(10) Patent No.: US 7,890,976 B2
(45) Date of Patent: Feb. 15, 2011

(54) DIGITAL TELEVISION AND CHANNEL SETTING METHOD THEREOF

(75) Inventor: In Hoon Kim, Daegu-si (KR)

(73) Assignee: LG Electronics Inc., Seoul (KR)

( * ) Notice: Subject to any disclaimer, the term of this patent is extended or adjusted under 35 U.S.C. 154(b) by 1192 days.

(21) Appl. No.: 10/883,841

(22) Filed: Jul. 6, 2004

(65) Prior Publication Data

US 2005/0010948 A1    Jan. 13, 2005

(30) Foreign Application Priority Data

Jul. 7, 2003    (KR) .................... 10-2003-0045620

(51) Int. Cl.
*H04N 5/445* (2006.01)
*G06F 3/00* (2006.01)
*G06F 13/00* (2006.01)

(52) U.S. Cl. .............................. 725/45; 725/46; 725/56

(58) Field of Classification Search .................. 725/56, 725/57

See application file for complete search history.

(56) References Cited

U.S. PATENT DOCUMENTS

| | | | |
|---|---|---|---|
| 5,585,866 A | 12/1996 | Miller et al. | |
| 5,737,029 A * | 4/1998 | Ohkura et al. | 725/56 |
| 5,822,123 A * | 10/1998 | Davis et al. | 725/43 |
| 6,128,009 A * | 10/2000 | Ohkura et al. | 725/46 |
| 6,493,688 B1 * | 12/2002 | Das et al. | 706/20 |
| 6,832,385 B2 * | 12/2004 | Young et al. | 725/39 |
| 2002/0023262 A1 | 2/2002 | Porter | |
| 2003/0008447 A1 | 1/2003 | Asayama et al. | |

FOREIGN PATENT DOCUMENTS

| | | |
|---|---|---|
| CN | 1352858 | 6/2002 |
| CN | 1375990 | 10/2002 |
| CN | 1416266 | 5/2003 |
| EP | 1063797 A2 * | 12/2000 |
| JP | 2000-069384 | 3/2000 |

OTHER PUBLICATIONS

KR-1997-0004683 (Abstracts Only).

* cited by examiner

*Primary Examiner*—John W Miller
*Assistant Examiner*—Chris Parry
(74) *Attorney, Agent, or Firm*—Birch, Stewart, Kolasch & Birch, LLP

(57) ABSTRACT

The present invention relates to a video display device, and more particularly, to a digital television and channel setting method thereof that enables a setting of preferred channels according to genre by selecting a channel label.

9 Claims, 3 Drawing Sheets

DIGITAL TELEVISION AND CHANNEL SETTING METHOD THEREOF

This Nonprofessional application claims priority under 35 U.S.C. §119(a) on Patent Application No(s). 10-2003-0045620 filed in KOREA on Jul. 7, 2003, the entire contents of which are hereby incorporated by reference.

BACKGROUND OF THE INVENTION

1. Field of the Invention

The present invention relates to a video display device, and more particularly, to a digital television and channel setting method thereof that enables a setting of preferred channels according to genre by selecting a channel label.

2. Description of the Related Art

Recently, as development in digital broadcasting technologies is accelerated, high definition and high quality sound broadcasting using satellite/ground wave/cable starts. The digital broadcasting has advantages of providing various additional services as well as the high definition and high quality sound compared with the related art analog broadcasting.

In the digital broadcasting, since high definition and high quality sound audio and video signals are compressed using video and audio compression methods such as MPEG02 and AC-3, and the compressed audio and video signals are transferred to users using a transferring method of QPSK/VSB/QAM through the general satellite/ground wave/cable band, a variety of services can be provided through one channel.

In the case of ground wave broadcasting, SD level can provide more than four channels to the previous one channel and HD level can provide one channel. In addition, the digital broadcasting transmits additional information together with A/V so as to provide a variety of services. In other words, using such an additional information, service such as broadcasting guidance regarding increased channels can be provided.

Namely, unlike in the past that could receive only the aerial wave channel, in the present digital broadcasting that can receive a variety of broadcasting channels through a cable or a satellite broadcasting, methods that can separate and manage 50-100 channels effectively are being researched.

In particular, thanks to advancement in audio/video compression and transmission technologies, it becomes possible that the digital broadcasting broadcasts more many channels compared with the conventional analog broadcasting. To this end, users have to waste considerable time for searching for channels that the users want to watch among increased channels.

Accordingly, the general digital television provides the function for preferred channels.

This function is to add only the desired channels among a variety of channels to a preferred channel item.

A method of editing preferred channels according to the related art will now be described with reference to FIG. 1.

Channel numbers of a current channel map are displayed as a bold character on a preferred channel editing screen.

First, when a user moves a preferred channel mark to an arbitrary channel on a current channel map using left/right/up/down directional keys of a remote controller, and inputs a button named "preferred channel" of the remote controller, a corresponding channel is stored in a preferred channel list, and a heart mark (♥) appears in front of the corresponding channel number.

As the user again input the button named "preferred channel", the corresponding channel number is deleted from the preferred channel list and the heart mark (♥) disappears.

When the editing operation of the preferred channels is completed, the preferred channels selected by the user are displayed on a left side of the screen as shown in FIG. 1 such that a channel switching is performed only with respect to the preferred channel stored in the preferred channel list using a button of the remote controller.

Thus, in the related art method of editing preferred channels, there are many cases that the number of preferred channels to be set. Also, when the user wants to tune channels according to genre by performing an additional genre setup (classification setup), the user has to directly perform such a genre designation through an additional procedure in addition to the preferred channel editing procedure.

SUMMARY OF THE INVENTION

Accordingly, the present invention is directed to a digital television and channel setting method thereof that substantially obviates one or more problems due to limitations and disadvantages of the related art.

An object of the present invention to provide a digital television and channel setting method thereof in which a corresponding channel is automatically set as a preferred channel as a user selects a channel label.

Another object of the present invention to provide a digital television and channel setting method thereof in which a corresponding channel is automatically set as a preferred channel included in a specific genre as a user selects a channel label.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital television, which displays a received video signal on a screen thereof, the digital television comprising: a memory storing a channel label setup menu enabling selection of a channel label; a video signal processing part for processing the channel label setup menu and the received video signal into signals displayable on the screen; and a microprocessor for setting genre of a channel according to an index allocated to a channel label selected by a user with reference to the channel label setup menu.

According to another aspect of the present invention, there is provided a digital television comprising: a tuner for selecting a channel; and a user interface through which a user request command for setting a channel label to a selected channel is inputted, wherein a channel label setup menu for displaying the channel label using the user interface is displayed by an OSD, and the selected channel is classified as a preferred channel by an operation that a user sets the channel label to the selected channel.

According to another aspect of the present invention, there is provided a method of setting a channel in a digital television provided with a memory, the method comprising the steps of: displaying a channel label setup menu for setting a channel label; if a desired channel is selected with reference to the displayed channel setup menu, retrieving genre with reference to an index of a corresponding channel stored in the memory; and if it is determined that the retrieved genre is valid, adding the corresponding channel to a list of the corresponding genre.

According to another aspect of the present invention, there is provided a method of setting a channel in a digital television, the method comprising the steps of: setting a channel label to a selected one of a plurality of channels; and classifying the channel that the channel label is set as a preferred channel.

According to another aspect of the present invention, there is provided a method of setting a channel in a digital television, the method comprising the steps of: setting a channel label to a selected channel of a plurality of channels; retrieving genre using an index, representing the genre of a channel, of the channel label; and classifying the selected channel as a specific genre according to the index.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
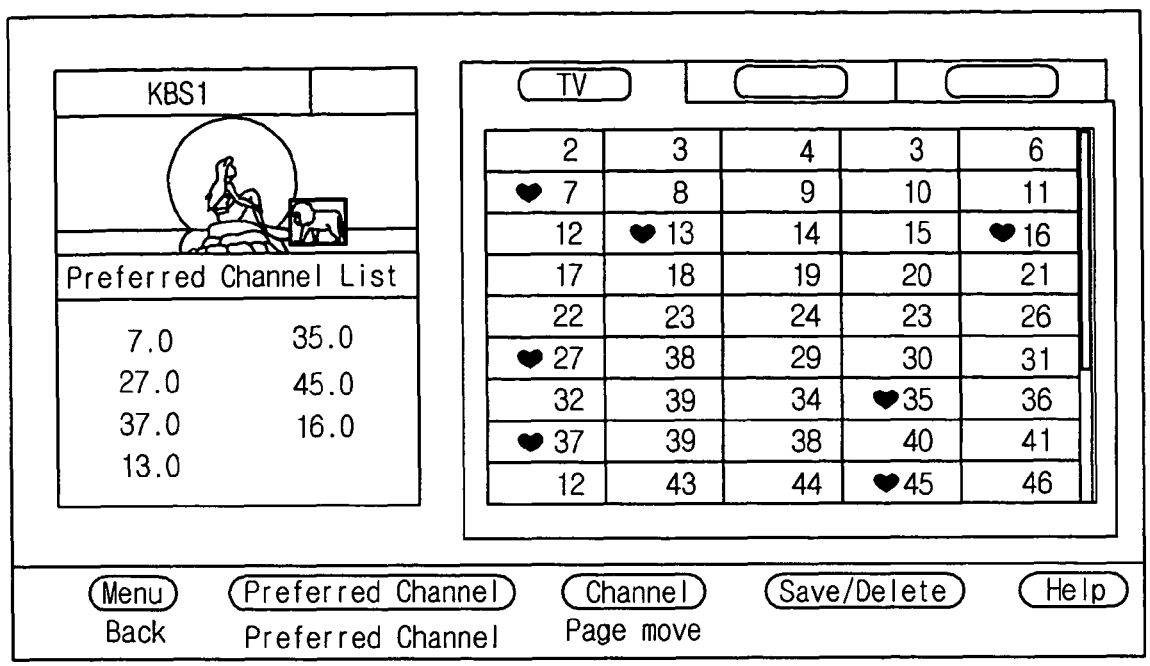
FIG. 1 illustrates a preferred channel setup screen according to the related art.
Figure 2:
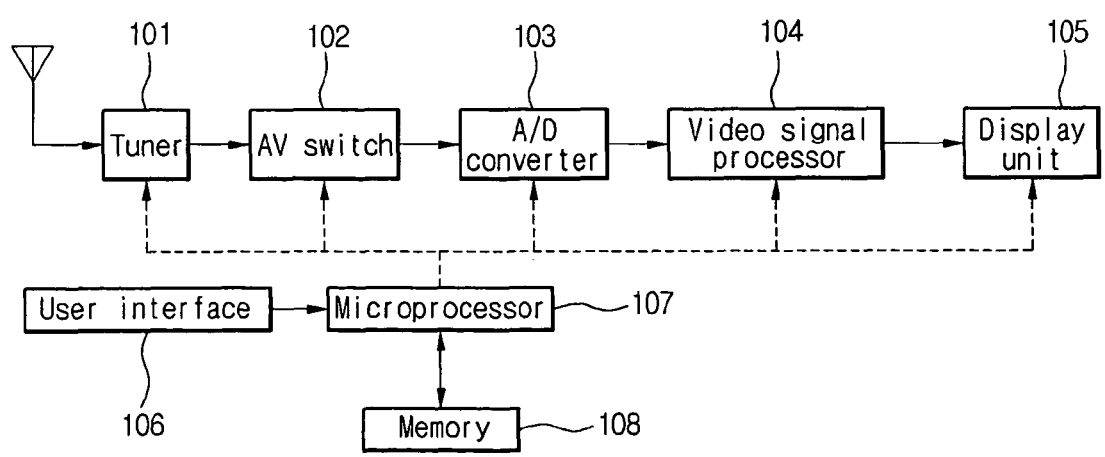
FIG. 2 is a block diagram illustrating a construction of a digital television according to the present invention.
Figure 3:
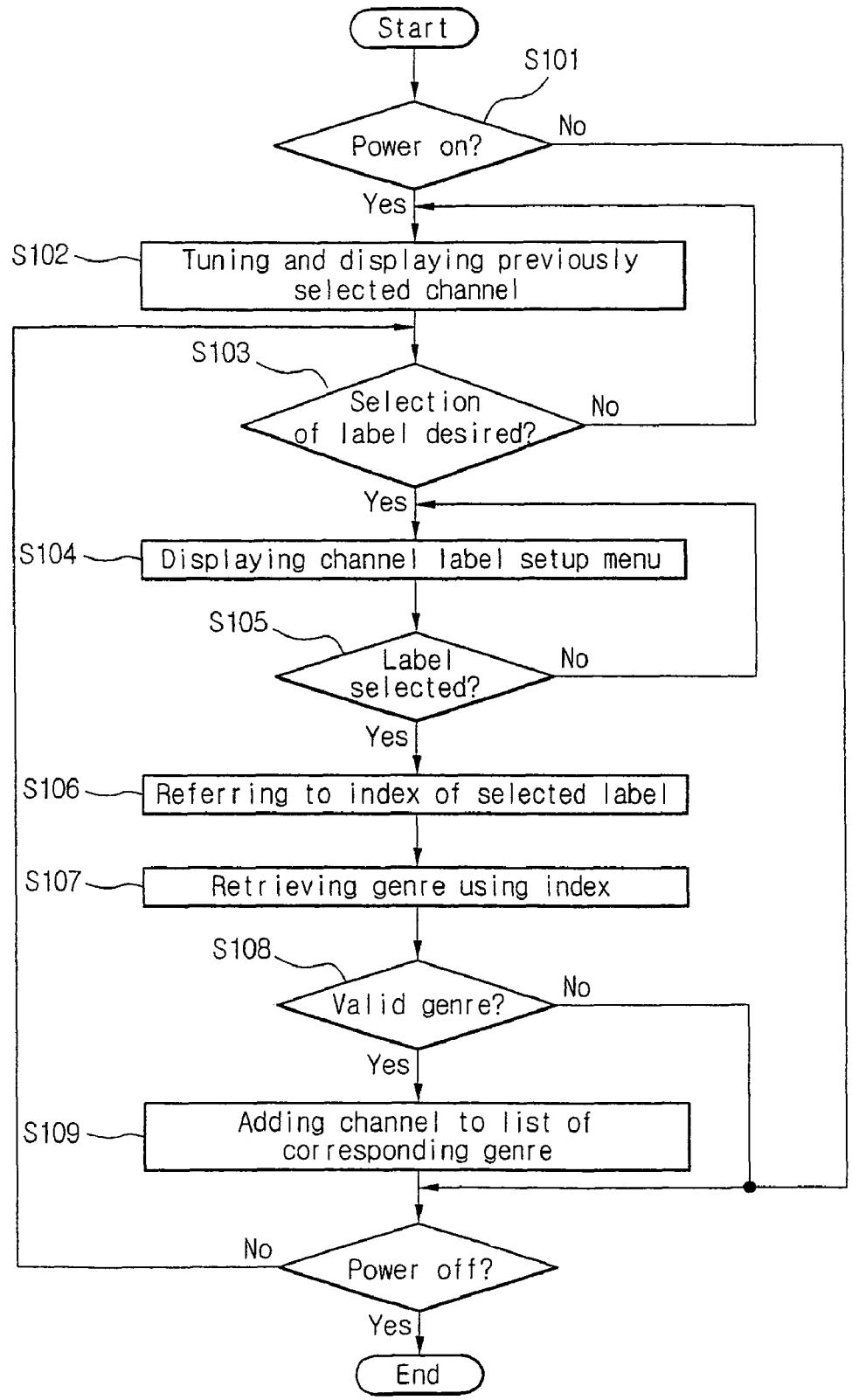
FIG. 3 is a flowchart illustrating a method of setting a channel of a digital television according to the present invention.

FIG. 2 is a block diagram illustrating a construction of a digital television according to the present invention, and FIG. 3 is a flowchart illustrating a method of setting a channel of the digital television according to the present invention.

Referring to FIG. 2, a digital television according to the present invention includes a tuner 101, an A/V switch 102, an A/D converter 103, a memory 108, a video signal processor 104, a microprocessor 107, a display unit 105, and a user interface 106. The tuner 101 receives an RF signal from an antenna and selects a desired channel according to a user's request, and the A/V switch 102 selectively outputs a signal selected by the tuner 101. The A/D converter 103 converts an analog video signal outputted from the A/V switch 102 into a digital video signal. The memory 108 stores a setup menu that can select a channel label (channel name). The video signal processor 104 receives the setup menu from the memory 108 or a video signal from the A/D converter 103 and processes them into a signal that can be displayed on a screen. The microprocessor 107 controls a genre setup by matching a corresponding index, which is previously stored according to the channel label (channel name) selected with reference to the setup menu by the user. The display unit 105 displays a video signal outputted from the video signal processor 104, and the user interface 106 allows the user to input a request command.

According to the digital television constructed as above, when an RF signal is inputted to the tuner 101, the A/V switch 102 selects one of an ATSC mode and an NTSC mode depending on the inputted video signal and outputs the signal to the A/D converter 103.

In other words, if an analog signal is outputted through the A/V switch 102, the A/D converter 103 converts the analog signal into a digital signal according to a control signal outputted from the microprocessor 107.

Also, if the user inputs a predetermined command for a preferred channel setup, the microprocessor 107 controls to display the channel label setup menu, which is previously stored in the memory 108, on an on screen display (OSD).

At this time, the channel label setup menu displays broadcasting station names for each channel, that is, channel labels, in a matrix configuration.

If the user selects a desired channel label with reference to the channel label setup menu displayed in such a manner, the microprocessor 107 determines whether or not an index allocated to the corresponding channel label belongs to a valid genre (e.g., an aerial wave channel, a movie channel, a home shopping channel, a sports channel, a music channel, a news channel), and decides whether to add it to a preferred channel belonging to the corresponding genre.

The channel label and information on the index allocated thereto can be stored in the memory 108 together with the channel label setup menu and provided to the user. Also, the channel label and the index information can be extracted from a received broadcast information and then stored in the memory 108. In the latter case, a broadcast information extracting unit is additionally provided in the digital television of FIG. 2.

If the channel label stored in the memory 108 is not proper, the user can directly input the channel label.

The index indicates whether or not the selected channel belongs to a specific genre (for example, a movie channel). A case that the index does not belong to the valid genre means that a genre information represented by the index is not present, or the index is not allocated.

A method of setting a channel of the digital television according to the present invention will now be described with reference to FIG. 2.

First, if the user inputs a power-on command, a channel is tuned (S101, S102).

Then, it is determined whether the user desires the channel label (S103).

If the user wants to select the channel label, the channel label setup menu that is previously stored in the memory is displayed in order for the selection of the channel label (S104).

Figure 4:
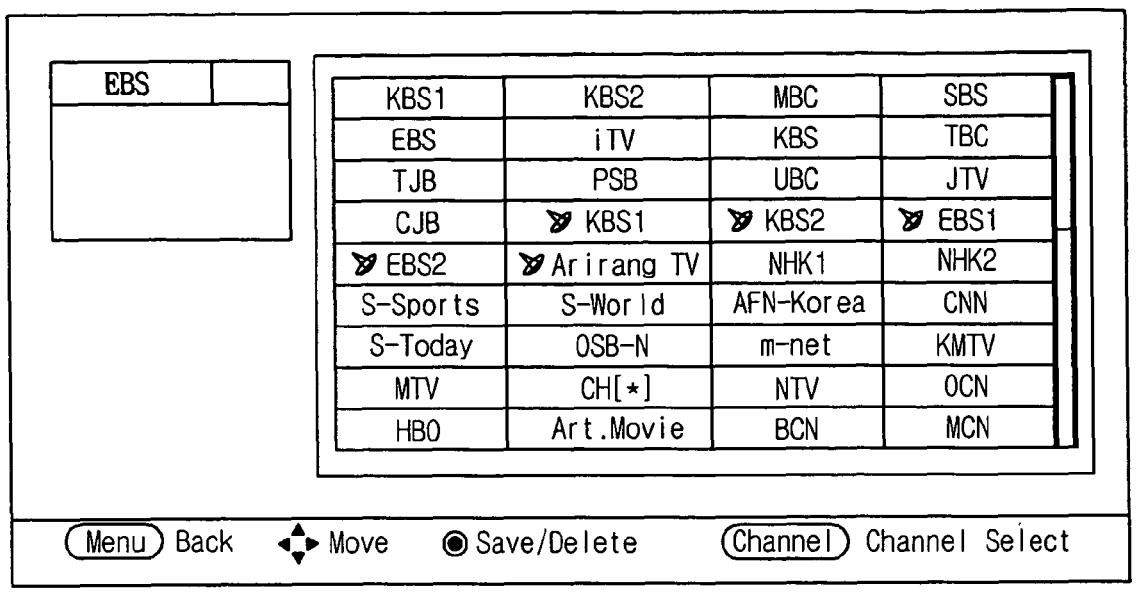
FIG. 4 illustrates a channel setup screen of a digital television according to the present invention.

At this time, the channel label setup menu displays the channel labels (channel names), not the channel numbers, in a matrix configuration, as shown in FIG. 4.

It is determined whether the user selects the desired channel label in the displayed channel label setup menu (S105).

If the user selects the desired channel label, a corresponding genre is retrieved using the index of the selected channel label (S106, S107).

Then, it is determined whether the retrieved genre is valid or not (S108).

If the retrieved genre is valid, the channel designated by the selected channel label is added to a preferred channel list of the corresponding genre (S109).

In the digital television and the method of setting the channel thereof according to the present invention, the index allocation table based on the channel labels that is set in the channel label setup menu by the user is configured like Table 1 below.

TABLE 1

| Classification | Channel Label(Index) |
| --- | --- |
| Aerial Wave | KBS1(0), KBS2(1), MBC(2), SBS(3), . . . |
| Movie Channel | OCN(20), Cathch 1(21), CGV Home(22), Cinema Channel(23) |
| Home Shopping Channel | LG Home Shopping(35), CJ Home Shopping(36), Woori Home Shopping(37) |

In other words, if the user selects the channel label, the microprocessor 107 reads out the index value allocated to the corresponding channel label. The microprocessor 107 checks which kind of genre the index value is classified into and sets the channel label as a preferred channel of the corresponding genre.

Accordingly, since the allocated index value is zero if the user selects KBS, the genre is allocated and set as the aerial wave. Since the allocated index value is 35 if the user selects LG home shopping, the genre is set as the home shopping channel.

At this time, the channels can be conveniently selected in an arbitrary preferred channel order or an arbitrary genre order by manipulating a "preferred channel" button of a remote controller.

Also, the remote controller can be manipulated by pressing the "preferred channel" button several times or inputting a specific button among a plurality of "preferred genre button". The input button and the input method can be changed depending on manufactures of the remote controller or the user's setup.

The digital television and the method of setting the channel thereof according to the present invention have following effects.

First, since the channel label setup menu that can set the preferred channel is provided in the matrix configuration based on the broadcasting station channel labels, the user can select the desired channel more conveniently.

Second, since the index of each channel is previously allocated, the genre of the preferred channel can be automatically checked and set if only the channel label is selected.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital television configured to display a received video signal on a screen thereof, the digital television comprising:

a broadcast information extracting part configured to extract a channel label and a corresponding channel index from broadcast information received with the video signal;

a memory configured to store a channel label setup menu;

a video signal processing part configured to process the channel label setup menu and the received video signal into signals displayable on the screen; and a microprocessor configured to in response to a user selection of the extracted channel label via the channel label setup menu, retrieve a genre corresponding to the extracted channel label via the corresponding channel index, determine whether or not the retrieved genre corresponds to a valid genre, and if the retrieved genre corresponds to the valid genre, add a channel associated with the channel label to a preferred channel list of the valid genre.

2. The digital television of claim 1, wherein the channel label setup menu is displayed on an OSD (on screen display).

3. The digital television of claim 1, further comprising:

a tuner configured to select the channel; and a user interface configured to receive the user selection.

4. The digital television of claim 3, wherein the channel label is displayed in a matrix configuration on the channel label setup menu.

5. The digital television of claim 1, wherein the valid genre comprises one of a broadcast genre, a movie genre, a home shopping genre, a sports genre, a music genre, and a news genre.

6. A method of controlling a digital television having a channel label setup menu stored therein, the method comprising:

receiving a video signal;

extracting a channel label and a corresponding channel index from broadcast information from the video signal;

processing the channel label setup menu and the received video signal into signals displayable on a screen of the digital television;

receiving a user selection of the extracted channel label via the channel label setup menu;

in response to the user selection, retrieving a genre corresponding to the extracted channel label via the corresponding channel index;

determining whether or not the retrieved genre corresponds to a valid genre; and if the retrieved genre corresponds to the valid genre, adding a channel associated with the channel label to a preferred channel list of the valid genre.

7. The method of claim 6, wherein the channel label setup menu is displayed on an OSD (on screen display).

8. The method of claim 6, further comprising:

displaying the channel label in a matrix configuration on the channel label setup menu.

9. The method of claim 6, wherein the valid genre comprises one of a broadcast genre, a movie genre, a home shopping genre, a sports genre, a music genre, and a news genre.

* * * * *